United States Patent
Kemeny (10) Patent No.: US 11,911,234 B2
(45) Date of Patent: Feb. 27, 2024

(54) TWO-COMPONENT MIXING CAPSULE, IN PARTICULAR FOR THE FIELD OF DENTISTRY

(71) Applicant: KULZER GMBH, Hanau (DE)

(72) Inventor: Andrea Kemeny, Friedrichsdorf (DE)

(73) Assignee: KULZER GMBH, Hanau (DE)

( * ) Notice: Subject to any disclaimer, the term of this patent is extended or adjusted under 35 U.S.C. 154(b) by 578 days.

(21) Appl. No.: 17/268,829

(22) PCT Filed: Sep. 11, 2019

(86) PCT No.: PCT/EP2019/074160
§ 371 (c)(1),
(2) Date: Feb. 16, 2021

(87) PCT Pub. No.: WO2020/053243
PCT Pub. Date: Mar. 19, 2020

(65) Prior Publication Data
US 2021/0186656 A1  Jun. 24, 2021

(30) Foreign Application Priority Data

Sep. 12, 2018  (DE) .................... 10 2018 122 285.8

(51) Int. Cl.
| A61C 5/64 | (2017.01) |
| A61C 5/66 | (2017.01) |
| A61C 5/68 | (2017.01) |

(52) U.S. Cl.
CPC .................. *A61C 5/68* (2017.02); *A61C 5/64* (2017.02); *A61C 5/66* (2017.02)

(58) Field of Classification Search
CPC ................ A61C 5/62; A61C 5/64; A61C 5/66
(Continued)

(56) References Cited

U.S. PATENT DOCUMENTS

| 4,515,267 A | 5/1985 | Welsh |
| 9,913,699 B2 | 3/2018 | Plaumann et al. |

(Continued)

FOREIGN PATENT DOCUMENTS

| DE | 102012102147 A1 | 9/2013 |
| DE | 102015200424 A1 | 7/2016 |

(Continued)

OTHER PUBLICATIONS

International Search Report dated Nov. 26, 2019, in connection with PCT International Application No. PCT/EP2019/074160.
English translation of International Search Report dated Nov. 26, 2019, in connection with PCT International Application No. PCT/EP2019/074160.
Written Opinion issued in connection with PCT International Application No. PCT/EP2019/074160.

*Primary Examiner* — David L Sorkin
(74) *Attorney, Agent, or Firm* — Norris McLaughlin, P.A.

(57) ABSTRACT

The invention relates to a mixing capsule (1) comprising a housing in the form of a cylinder, characterised in that the mixing capsule has an applicator (2) at the top surface (15) of the cylinder and an auxiliary capsule (3) at the base surface of the cylinder being mounted displaceably in the direction of the longitudinal axis, the auxiliary capsule (3) being mounted displaceably in the direction of the longitudinal axis in a cylindrical inside pipe (4) and/or a mounting of the mixing capsule (1), the housing of the mixing capsule comprising an outer housing sleeve (5) and an inner housing sleeve (6) being mounted rotatably against each other and displaceably into each other, the auxiliary capsule (3) and the cylindrical inside pipe (4) and/or the mounting taking a first partial volume of the internal volume (9) of the mixing capsule (1) in a first position of the inner housing sleeve (6), the mixing capsule (1) having a second partial volume of the internal volume (9) being independent from the auxiliary capsule (3) and the cylindrical inside pipe (4) and/or the mounting, the second partial volume having a composition A, the auxiliary capsule (3) containing a composition B, the (Continued)

internal volume (9) of the cylinder being increased compared to the first position in a second position of the inner housing sleeve (6) after the outer housing sleeve (5) and the inner housing sleeve (6) being pushed apart along the longitudinal axis, the increased internal volume (9) being adapted to receive composition B besides composition A, composition A and composition B being mixable to composition C by moving the mixing capsule, composition C being ejectable via the applicator (2) when the outer housing sleeve (5) and the inner housing sleeve (6) being telescoped. Furthermore, the invention relates to a method for mixing at least two compositions A and B to a composition C in a mixing capsule. The invention likewise refers to a use of a mixing capsule.

21 Claims, 3 Drawing Sheets

(58) Field of Classification Search
USPC .................................................. 206/219, 222
See application file for complete search history.

(56) References Cited

U.S. PATENT DOCUMENTS

| | | | |
|---|---|---|---|
| 2004/0020796 A1* | 2/2004 | Cheetham | A61C 5/64 206/219 |
| 2007/0272567 A1* | 11/2007 | Peuker | A61C 5/66 206/219 |
| 2014/0034670 A1* | 2/2014 | Cheetham | A61C 5/64 206/219 |
| 2016/0199166 A1 | 7/2016 | Plaumann et al. | |
| 2017/0042640 A1* | 2/2017 | Boehm | A61C 5/64 |

FOREIGN PATENT DOCUMENTS

| | | |
|---|---|---|
| EP | 1159931 A2 | 12/2001 |
| EP | 2853227 A1 | 4/2015 |
| WO | 0023002 A1 | 4/2000 |
| WO | 0045732 A1 | 8/2000 |

* cited by examiner

TWO-COMPONENT MIXING CAPSULE, IN PARTICULAR FOR THE FIELD OF DENTISTRY

This application is a 371 of International Patent Application No. PCT/EP2019/074160, filed Sep. 11, 2019, which claims foreign priority benefit under 35 U.S.C. § 119 of the German Patent Application No. 10 2018 122 285.8, filed Sep. 12, 2018, the disclosures of which are incorporated herein by reference.

The present invention relates to a mixing capsule, in particular for dental field.

A multitude of mixing capsules in dental field being suitable for storing and mixing of two-component (2K) compositions are known from the state of the art. Mixing capsules in dental field are normally characterised by their short length of approximately 32 mm to allow insertion of the mixing capsule into the fixing brackets of known mixers. The mixing capsules according to the state of the art normally have two chambers separated by a foil having a predetermined breaking point which comprise one of the two components of the two-component composition respectively, wherein a piston penetrates the foil prior to mixing. The mixing capsule may be inserted into a tool after mixing which displaces an ejection piston into the mixing capsule and may thus convey the mixed composition out of the mixing capsule.

Disadvantageously, the known mixing capsules are normally adapted to mix a liquid monomer component with a powdered component. Almost no economically producible or easy-to-use mixing capsules are known from the state of the art having the ability to mix also two pasty to kneadable 2K-component compositions with each other.

It was the object of the invention to develop a mixing capsule allowing storage and mixing of pasty to kneadable and optionally with powdered or pasty to solid and concurrently thixotropic multi-component compositions, wherein liquid with powdered components are preferably being mixed also. Furthermore, it was the object to dimension the mixing capsule such to be insertable into common mixing apparatuses, such as being present in dental practices.

The object of the invention is solved by a mixing capsule comprising a housing in the form of a cylinder, the mixing capsule having an applicator at the top surface of the cylinder and an auxiliary capsule in the region of the base surface of the cylinder, preferably at the base surface of the cylinder or outwardly moved from there along the longitudinal axis of the cylinder, being mounted displaceably in the direction of the longitudinal axis, the auxiliary capsule being mounted displaceably in the direction of the longitudinal axis in a cylindrical inside pipe and/or a mounting of the mixing capsule, the housing of the mixing capsule comprising an outer housing sleeve and an inner housing sleeve being mounted rotatably against each other and displaceably into each other, the auxiliary capsule and the cylindrical inside pipe and/or the mounting taking a first partial volume of the internal volume of the mixing capsule in a first position of the inner housing sleeve, the mixing capsule having a second partial volume of the internal volume being independent from the auxiliary capsule and the cylindrical inside pipe and/or the mounting, the second partial volume having a composition A, the auxiliary capsule containing a composition B, the internal volume of the cylinder being increased compared to the first position in a second position of the inner housing sleeve after the outer housing sleeve and the inner housing sleeve being pushed apart along the longitudinal axis, the increased internal volume being adapted to receive composition B besides composition A, composition A and composition B being mixable to composition C by moving the mixing capsule, composition C being ejectable via the applicator when the outer housing sleeve and the inner housing sleeve being telescoped.

In doing so, the mixing capsule according to the invention has the advantage over the state of the art that storage and mixing of pasty to kneadable and optionally with powdered or pasty to solid and concurrently thixotropic multi-component compositions is feasible, wherein liquid with powdered components are preferably being mixed also. Additional mixing space is formed by the increased internal volume of the mixing capsule when the inner housing sleeve and the outer housing sleeve being turned apart and/or pushed apart from each other, in which compositions A and B may be mixed to composition C.

Compositions A and B are brought into a common mixing space by pushing and/or turning the components of the mixing capsule, such as the inner and/or outer housing sleeve and/or auxiliary capsule and/or ejection piston. Said mixing space is then extended for the mixing process in a mixer by turning the components again (extended mixing space). The capsule has two locking points, one for the short embodiment and one for the long embodiment; this may be realised e.g. by means of bayonet catches. The mixing capsule is re-turned together to the short embodiment after mixing to make the travel able to convey out the complete mixture of mixed composition C using a PLT applicator. The discharge opening is rotated for conveying out such that the opening corresponds with that of the capsule housing. The discharge opening is formed as common PLT applicators to be able to directly apply into the mouth.

The mixing capsule according to the invention with capsule housing and without auxiliary capsule and without ejection piston preferably has a length of less than or equal to 10 cm, preferably less than or equal to 8 cm, particularly preferably a length of less than or equal to 5 cm or less than or equal to 3.5 cm. The complete mixing space of the mixing capsule preferably has a length of 2.0 to 4.0 cm, in particular of 2.5 to 3.0 cm with a diameter of 0.5 to 2.0 cm, in particular of 0.8 to 1.2 cm. The volume of the common mixing space amounts approximately from 20 to 200 mm$^3$, in particular from 50 mm$^3$ to 135 mm$^3$. The mixing capsule according to the invention is formed such that it may be inserted into common PLT discharging devices or PLT applicators respectively.

The second partial volume of the internal volume of the mixing capsule corresponds to the residual volume of the internal volume not taken by the auxiliary capsule and not taken by the cylindrical inside pipe and/or mounting for the auxiliary capsule. Composition A is situated in the second partial volume prior to the mixing phase. The second partial volume of the internal volume, in which composition C is situated after mixing, is situated at the side of the internal volume of the mixing capsule facing the applicator.

Accordingly, the first partial volume of the internal volume of the mixing capsule is the volume taken by the auxiliary capsule and by the cylindrical inside pipe and/or the mounting for the auxiliary capsule.

The base surface is the surface the body stands on. The top surface is the surface being visible when looking onto the body from above.

The first position of the inner housing sleeve corresponds to the position in which the inner housing sleeve is pulled into the outer housing sleeve as far as possible. The second position of the inner housing sleeve corresponds the position in which the inner housing sleeve is pulled out of the outer housing sleeve as far as possible, wherein the limit is set by locking means.

In a further embodiment, it is provided for the auxiliary capsule to have an ejection piston, the ejection piston being adapted to convey composition B out of the auxiliary capsule when being pushed and/or turned, preferably when being pushed and optionally turned additionally, in particular into the second partial volume or the increased internal volume. The increased internal volume serves as mixing space.

The process of mixing is initiated in an advantageous manner by pushing and/or turning the ejection piston of the auxiliary capsule and composition B is largely conveyed into the second partial volume in which composition A is situated and which is independent from the auxiliary capsule and independent form the cylindrical inside pipe and/or the mounting for the auxiliary capsule. Pushing and/or turning may be carried out manually or automatically in an appropriate commercial mixing apparatus.

In a further embodiment, the cylindrical inside pipe or the mounting is adapted to receive, in particular completely receive, the auxiliary capsule.

In this way, the auxiliary capsule may completely be pulled into the mixing capsule in an advantageous manner and the mixing capsule receives outer dimensions being compatible to conventional commercial mixing apparatuses, so that the mixing capsule may be clamped into such a conventional commercial mixing apparatus during the mixing process.

The auxiliary capsule with content may manually be inserted into and pulled into the cylindrical inside pipe. Or the auxiliary capsule with content is already provided when the mixing capsule being delivered.

In a further embodiment, it is provided for the inner housing sleeve to have a first outer radius and a second outer radius, the first outer radius being situated at the side facing the applicator, the second outer radius being at the side averting the applicator, the first outer radius being smaller than the second outer radius, the outer housing sleeve having an inner radius, the inner radius of the outer housing sleeve being larger than or almost equal to the first outer radius of the inner housing sleeve.

In this way, the inner housing sleeve may be telescoped into the outer housing sleeve (first position) in an advantageous manner and both may be twisted against each other. At the same time, the inner housing sleeve may be pulled out of the outer housing sleeve in a telescope-like manner (second position) up to a certain point where a locking means such as e.g. a detent cam on the lateral surface of the inner housing sleeve engages with a counter-part of the engaging mechanism on the inside of the outer housing sleeve. The internal volume of the mixing capsule is increased by limited pulling apart and/or turning apart, so that an extended mixing space is available due to formation of the second partial volume. The second partial volume of the internal volume is the part of the internal volume of the mixing capsule being independent from the auxiliary capsule and the cylindrical inside pipe and/or the mounting for the auxiliary capsule. Composition A is situated in the second partial volume. Preferably, the inner housing sleeve and the outer housing sleeve are cylindrical respectively, the inner housing sleeve in particular being mounted in the outer housing sleeve rotatably and displaceably in a telescope-like manner.

Thus, the length of the mixing capsule is variable. A certain length of the mixing capsule may be fixed by different locking mechanisms being situated at the inner and/or outer wall of the outer housing sleeve and/or inner housing sleeve at different positions. The length of the mixing capsule may vary depending on the use phase. A short and compact embodiment of the mixing capsule is advised for storage, transport and application phase. The long and prolated embodiment of the mixing capsule is suitable for mixing phase.

In a further embodiment, the second outer radius of the inner housing sleeve is almost equal to or greater than the outer radius of the outer housing sleeve.

Thus, the mixing capsule has a uniform outer radius (if the outer radii being equal) in telescoped state of inner capsule housing and outer capsule housing (first position). The lateral surface of the cylindrical housing of the mixing capsule is uniform and has no discontinuity although the lateral surface of the cylindrical housing of the mixing capsule is formed in part of the outer surface of the outer housing sleeve and also in part of the outer surface of the inner housing sleeve in the first position.

In a further embodiment, it is provided for the outer housing sleeve to encase the inner housing sleeve in part in the first position and in the second position, the encasement being maximal in the first position and minimal in the second position.

The outer housing sleeve encases the inner housing sleeve at the maximum in the first position, thus when the inner housing sleeve being pulled into the outer housing sleeve at a maximum. The outer housing sleeve encases the inner housing sleeve at a minimum in the second position, thus when the inner housing sleeve is pulled out of the outer housing sleeve at a maximum. The first position corresponds to storage and transport stage as well as to the ejection process. The second position corresponds to the state during mixing.

In a further embodiment, it is provided for the inner housing sleeve to be mounted within the outer housing sleeve displaceably along the longitudinal axis of the mixing capsule and rotatably about the longitudinal axis of the mixing capsule.

In this way, the mixing capsule may be pulled apart and/or turned apart in a telescope-like manner and the internal volume of the mixing capsule may be increased during the mixing process in an advantageous manner.

The longitudinal axis corresponds to the longitudinal axis of the cylindrical housing of the mixing capsule.

In a further embodiment, the cylindrical inside pipe or the mounting is mounted within the inner housing sleeve displaceably along the longitudinal axis of the mixing capsule.

In this way, the second partial volume of the internal volume of the mixing capsule may be significantly reduced in the ejection phase by means of a discharge piston of a PLT applicator being put on the ejection piston of the auxiliary capsule and composition C may be ejected out of the mixing capsule by means of the discharge piston of the PLT applicator. The auxiliary capsule and the cylindrical inside pipe and/or the mounting for the auxiliary capsule move in the direction of the applicator in ejection process, so that the second partial volume is reduced to a minimum, so that composition C is ejected out of the mixing capsule. In doing so, the discharge piston of the PLT applicator drives into the inner housing sleeve at the side averting the applicator.

In a further embodiment, it is provided for the internal volume of the mixing capsule to be equal to internal volume of the inner housing sleeve in a first position of the inner housing sleeve.

The internal volume of the mixing capsule is at a minimum in the first position in which the inner housing sleeve is completely pulled into the outer housing sleeve; it corresponds to the internal volume of the inner housing sleeve. In the first position, the internal volume, the second partial volume, is restricted at the part facing the applicator by both the inner housing sleeve and also the outer housing sleeve.

In a further embodiment, the internal volume of the mixing capsule is almost equal to the sum of the internal volume of the inner housing sleeve and the internal volume of the outer housing sleeve in the second position of the inner housing sleeve.

In a preferred embodiment of the mixing capsule in the first position and in the second position of the inner housing sleeve and the outer housing sleeve, the inner housing sleeve is partially encased by the outer housing sleeve, the encasement being larger in the first position than in the second position.

The internal volume of the mixing capsule is at the maximum in the second position in which the inner housing sleeve is almost completely pulled out of the outer housing sleeve; it almost corresponds to the internal volume of the inner housing sleeve plus the internal volume of the outer housing sleeve. In the second position, the internal volume, the second partial volume, is merely restricted at the part facing the applicator by the outer housing sleeve.

In a further embodiment, it is provided for a part of the outer housing sleeve and a part of the inner housing sleeve to be lockable, in particular form a bayonet catch, in a first position of the inner housing sleeve after the outer housing sleeve and the inner housing sleeve being telescoped along the longitudinal axis and after being rotated about the longitudinal axis. Preferably, a part of the outer housing sleeve is understood to mean a region of the outer housing sleeve and a part of the inner housing sleeve is understood to mean a region of the inner housing sleeve.

Hence, the first position and/or the second position of the inner housing sleeve is fixable in an advantageous manner. No displacement of the first position and/or the second position occurs. The first position is thus suitable for storage of compositions A and B and their transport. The first position is also suitable for the application phase when the mixing capsule being clamped into a PLT applicator. The second position is suitable for the mixing phase.

In a further embodiment, it is provided for the cylindrical inside pipe and/or the mounting of the mixing capsule to have at least one guiding rail, the at least one guiding rail being adapted to guide the auxiliary capsule when being slid into the cylindrical inside pipe and/or the mounting of the inner housing sleeve.

In this way, the auxiliary capsule is guided in its sliding through the cylindrical inside pipe and/or the mounting into at least one guiding rail in an advantageous manner. Thus, a certain position of the auxiliary capsule is reproducibly producible. A certain position and a certain degree of rotation of the auxiliary capsule are adjustable.

In an embodiment, the cylindrical inside pipe is a guiding groove or a mounting.

According to an embodiment, the auxiliary capsule has a helical bar at the outer periphery, the helical bar being adapted to guide the auxiliary capsule when being rotated about the longitudinal axis of the auxiliary capsule and when the auxiliary capsule being slid into the cylindrical inside pipe and/or the mounting of the inner housing sleeve, the helical bar interacting with a notch and/or recess at the cylindrical inside pipe and/or the mounting when the auxiliary capsule being rotated about the longitudinal axis of the auxiliary capsule and when the auxiliary capsule being slid into the cylindrical inside pipe and/or the mounting of the inner housing sleeve.

In this way, a degree of rotation of the auxiliary capsule is predefined in an advantageous and reproducible manner when the auxiliary capsule being slid into the cylindrical inside pipe. Composition B, which is initially situated in the auxiliary capsule, is mixed once again before leaking out of the mixing capsule and thus its consistency is homogenized by turning the auxiliary capsule when being slid into the cylindrical inside pipe. No depositions of composition B occur in the auxiliary capsule.

In a further embodiment, it is provided for the outer housing sleeve to have a guiding groove in its inside, the guiding groove being directly adjacent to the inner housing sleeve, the guiding groove being adapted to completely receive the cylindrical inside pipe and/or the mounting along with auxiliary capsule and ejection piston when the cylindrical inside pipe and/or the mounting along with the auxiliary capsule and the ejection piston displaced from the inner housing sleeve into the outer housing sleeve along the longitudinal axis of the mixing capsule, the guiding groove in particular having respectively one detent cam at each of its longitudinal edges, being adapted to interact with an end edge and/or a recess of the cylindrical inside pipe and/or the mounting.

In this way, the cylindrical inside pipe along with auxiliary capsule and ejection piston is kept in its orbit in transition from the inner housing sleeve into the outer housing sleeve and transition from the inner housing sleeve into the outer housing sleeve is carried out in a form-fit manner without undesired displacements of the auxiliary capsule. At the same time, the displaced auxiliary capsule functions as a piston due to form-fit with the environment to eject composition C.

According to an embodiment, the applicator has a rotatable disc, in particular a round disc, at the top surface of the outer housing sleeve, the disc, in particular the round disc, being mounted rotatably about the longitudinal axis of the mixing capsule, the disc, in particular the round disc, having a hole being arranged congruently to a discharge opening of the applicator, the applicator further having an outlet opening, a discharge nozzle being arranged between the discharge opening and the outlet opening of the applicator. The disc may also be polygonal or elliptic. Preferably, the disc has an element, such as a handle element, that facilitates rotatability of the disc.

The mixing capsule may be brought into a closed and opening state by rotating the round disc of the applicator. In mixing and storage phase, the round disc shall be rotated about the longitudinal axis of the mixing capsule such that the mixing capsule is closed. In discharge phase, the round disc shall be rotated such that the mixing capsule is opened and composition C is dischargeable through the discharge nozzle through the outlet opening.

In a further embodiment, it is provided for the applicator to have a rotatably mounted disc at the top surface of the cylinder, the disc being rotatable congruently with the hole to the discharge opening of the applicator.

There is an opened state of the mixing capsule when the hole of the round disc and the discharge opening of the applicator being in congruency, a close state of the mixing capsule when being in incongruency. Composition C is dischargeable through the discharge opening when the hole of the round disc and the discharge opening of the applicator being in congruency. The mixing capsule is closed when the hole of the round disc and the discharge opening of the applicator being in incongruency, so that compositions A and B may be stored and mixed.

According to an embodiment, the guiding groove and the round disc are integrally connected and the hole is rotatable congruently to the discharge opening of the applicator by rotating the inner housing sleeve.

In this way, the number of components is reduced in an advantageous manner. At the same time, stability of the position of the round disc is increased. The round disc may not rotate at will. The mixing capsule does not open in undesired manner during storing and/or mixing of compositions A and B.

In a further embodiment, it is provided for the outer housing sleeve to have an outlet opening at the top surface, the hole of the round disc of the applicator being bringable into congruency to the outlet opening of the outer housing sleeve by rotating the round disc about the longitudinal axis of the mixing capsule.

In doing so, safety for the mixing capsule to be really closed is increased. The mixing capsule is opened not before outlet opening of the outer housing sleeve, hole of the round disc and discharge opening of the applicator being in congruency and composition C is dischargeable through the discharge nozzle of the applicator. The mixing capsule is closed when outlet opening of the outer housing sleeve, hole of the round disc and/or discharge opening of the applicator being in incongruency and compositions A and B may be stored or mixed respectively.

According to an embodiment, the inner housing sleeve has at least one guiding notch or guiding bar and at least one cross bar at its outside for the bayonet catch.

In doing so, relative rotation between inner and outer housing sleeve is predefined and turning together of the two components reproducibly ceases in locking by means of bayonet catch. The structures interacting with each other of the bayonet catch are brought together in a target-oriented manner by the guiding notch or the guiding bar.

In a further embodiment, it is provided for the cylindrical inside pipe and/or the mounting to have at least one guiding bar at its outside, the at least one guiding bar being adapted to guide the cylindrical inside pipe and/or the mounting when being slid into the inner housing sleeve and into the outer housing sleeve.

In this way, it is ensured for the cylindrical inside pipe and/or the mounting to be guided through the inner housing sleeve and the outer housing sleeve in an advantageous manner when being displaced in a predefined manner.

In a further embodiment, the mixing capsule comprises cyclic olefin polymer, cyclic olefin copolymers, polyethylene, polypropylene, polyethylene having low density (LDPE), polyethylene having high density (HDPE), polypropylene having low density (LDPP), polypropylene having high density (HDPP) and/or a mixture comprising at least one of the afore-mentioned polymers. Cyclic olefin copolymers have high stiffness, strength and hardness as well as low density and high transparency with good acid and lye resistance. The extremely low water absorption/water vapour permeability are to be pointed out. All polyethylene types are characterized by high chemical resistance, good electrical insulation capacity and good gliding behaviour. PE-HD (HDPE): lightly branched polymer chains, thus high density between 0.94 g/cm$^3$ and 0.97 g/cm$^3$, ('HD' signifies 'high density'). PE-LD (LDPE): strongly branched polymer chains, thus low density between 0.915 g/cm$^3$ and 0.935 g/cm$^3$, ('LD' signifies 'low density').

High crystallinity of polymers leads to high density, stiffness, hardness, abrasion resistance, use temperature and chemical resistance. Polyethylene has high resistance to acids, lyes and further chemicals. Polyethylene hardly absorbs water. Gas and water vapour permeability (only polar gases) is lower than for most plastics; whereas it makes oxygen, carbon dioxide and flavourings passing through well. The properties of polypropylene are similar to polyethylene; it is yet harder and more heat resistant.

In a further embodiment, the invention relates to a method for mixing at least two compositions A and B to a composition C in a mixing capsule, the method comprising the steps of:

(A.i) providing a mixing capsule having an inserted auxiliary capsule with composition B in a cylindrical inside pipe or a mounting of the mixing capsule, the mixing capsule containing composition A in the outer housing sleeve and/or the inner housing sleeve;

(A.ii) optionally, letting composition B out into the second partial volume of the internal volume of the mixing capsule;

(A.iii) increasing the internal volume for compositions A and B by turning apart and pulling apart an inner housing sleeve out of an outer housing sleeve along the longitudinal axis of the mixing capsule;

(A.iv) mixing compositions A and B in the increased internal volume by the mixing capsule being moved;

(A.v) obtaining composition C.

In an embodiment, letting composition B out into the second partial volume of the internal volume of the mixing capsule is carried out prior to the mixing space being extended by pulling apart the outer housing sleeve from the inner housing sleeve.

In a further embodiment, letting composition B out into the second partial volume of the internal volume of the mixing capsule is carried out after the mixing space having been extended by pulling apart the outer housing sleeve from the inner housing sleeve.

Figure 5:
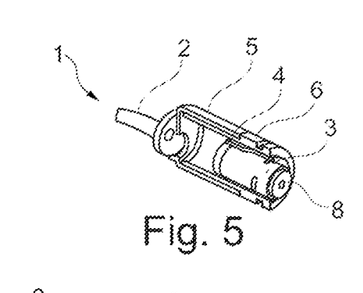
FIG. 5 shows the mixing capsule 1 according to the invention after mixing phase in cross profile.
Figure 6:
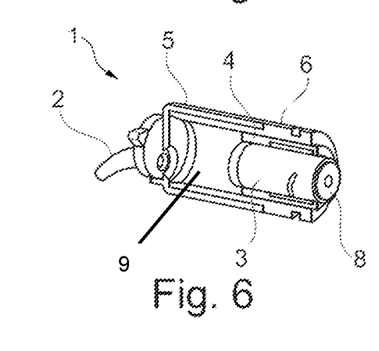
FIG. 6 shows the mixing capsule with the applicator 2 in a state, so that the paste being dischargeable by the applicator 2.
Figure 7:
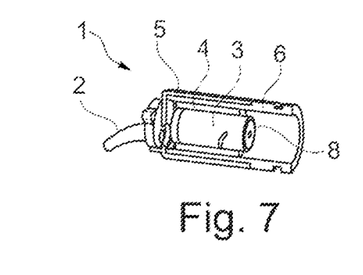
FIG. 7 shows the mixing capsule 1 according to the invention in ejection phase in cross profile.

In a further embodiment, the method further comprises the steps of:

step (B.i) is carried out after step (A.i) optionally, turning and/or pushing an ejection piston into the auxiliary capsule;

(B.ii) optionally, turning and/or pushing the auxiliary capsule into the mixing capsule, the auxiliary capsule being guided along a cylindrical inside pipe or the mounting;

step (B.iii) is carried out after step (A.ii) optionally, opening a locking between an outer housing sleeve and an inner housing sleeve, in particular a bayonet catch. For example, as shown in FIGS. 5 to 7.

In a further embodiment, turning and/or pushing an ejection piston into an auxiliary capsule and turning and/or pushing the auxiliary capsule into the mixing capsule, wherein the auxiliary capsule is guided along a cylindrical inside pipe or the mounting, is carried out prior to the mixing space being extended by pulling apart the outer housing sleeve from the inner housing sleeve.

In a further embodiment, turning and/or pushing an ejection piston into an auxiliary capsule and turning and/or pushing the auxiliary capsule into the mixing capsule, wherein the auxiliary capsule is guided along a cylindrical inside pipe or the mounting, is carried out after the mixing space having been extended by pulling apart the outer housing sleeve from the inner housing sleeve.

In a further embodiment, it is provided that (iv) mixing compositions A and B in the increased internal volume is realised by a universal mixer for dental materials.

The mixing process may be realised by means of a known commercial mixer, e.g. 3M-ESPE-CAPMIX, by the mixing capsule being clamped into the mounting provided of the mixer. The mixing capsule is moved at least along a part of the longitudinal axis of the mixing capsule or the capsule housing respectively in an oscillating manner when being mixed. Preferably, the mixing capsule with a part of its longitudinal axis is moved along a circular orbit having a radius in an oscillating manner. Alternatively, manual mixing is feasible.

In a further embodiment, the method further comprises the steps of:

(A.vi) reducing the increased internal volume by displacing the inner housing sleeve into the outer housing sleeve along the longitudinal axis of the mixing capsule and rotating the inner housing sleeve and the outer housing sleeve about the longitudinal axis of the mixing capsule;

(A.vii) optionally, closing the locking of the inner housing sleeve and of the outer housing sleeve, in particular the bayonet catch;

(A.viii) rotating a round disc of the applicator about the longitudinal axis of the mixing capsule, so that a hole of the round disc is brought into congruency to an outlet opening of the outer housing sleeve, the hole of the round disc being arranged congruently to a discharge opening of the applicator, the applicator further comprising an outlet opening, a discharge nozzle being arranged between the discharge opening and the outlet opening of the applicator;

(A.ix) displacing the cylindrical inside pipe or the mounting with inserted auxiliary capsule in the direction of the applicator; and optionally (A.x) discharging composition C out of the internal volume of the mixing capsule through the discharge nozzle of the applicator.

According to an embodiment, the guiding groove and the round disc are integrally connected and the hole of the round disc is rotatable congruently to the discharge opening of the applicator by rotating the inner housing sleeve, so that method step (A.viii) is to be replaced by:

(B.viii) rotating the inner housing sleeve, so that the hole of the round disc is congruent to the discharge opening of the applicator.

Furthermore, the invention relates to a use of a mixing capsule, an increased internal volume being formed when pulling apart and/or turning apart an inner housing sleeve out of an outer housing sleeve, in which at least two compositions A and B are being mixed to a composition C. Preferred compositions A and B are pasty and thixotropic compositions.

In a further embodiment, the invention relates to a use of the mixing capsule for storing, mixing and applying pasty to kneadable dental two-component compositions. Thus, a mixing capsule has been developed allowing storage and mixing of pasty to kneadable and optionally with powdered or pasty to solid and concurrently thixotropic multi-component compositions, wherein liquid with powdered components are preferably being mixed also. The mixable compositions are preferably thixotropic dental compositions. Another subject matter of the invention is a kit comprising a mixing capsule comprising a composition A and a composition B.

Further details, features and advantages of the invention derive from the figures, as well as from the following description of preferred embodiments by reference to the figures. In doing so, the figures merely illustrate exemplary embodiments of the invention not limiting the substantial subject of the invention.

EMBODIMENTS OF THE INVENTION

Figures 1, 4:
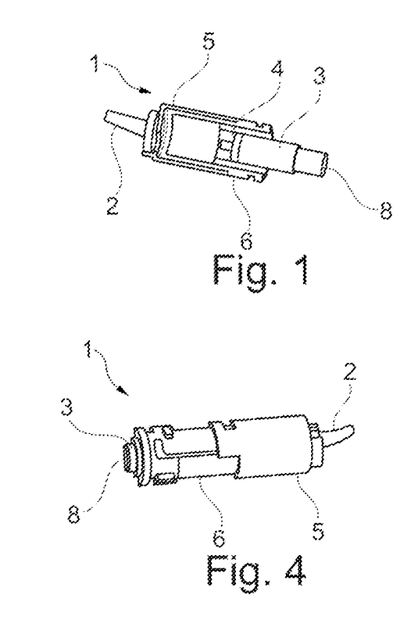
FIG. 1 shows a mixing capsule 1 according to the invention in starting state in cross profile.
FIG. 4 shows an exterior view of the mixing capsule 1 according to the invention with the second position of the inner housing sleeve 6 in mixing phase.

FIG. 1 shows the mixing capsule 1 according to the invention in starting state in cross profile. The housing of the mixing capsule 1 corresponds to a cylinder. The mixing capsule has an applicator 2 at the top surface of the cylinder. The mixing capsule has an auxiliary capsule 3 at the base surface of the cylinder being mounted displaceably along the longitudinal axis in a cylindrical inside pipe 4 or a mounting of the mixing capsule. The lateral surface of the cylinder is formed of an outer housing sleeve 5 for the most part and of a part of an inner housing sleeve 6, wherein the inner housing sleeve 6 is present displaced into the outer housing sleeve 5 in the direction of the longitudinal axis in starting state, what corresponds to a first position of the inner housing sleeve 6.

The cylindrical inside pipe 4 or the mounting and the auxiliary capsule 3 take a first partial volume of the internal volume of the mixing capsule 1. The mixing capsule has a second partial volume of the internal volume being independent from the cylindrical inside pipe 4 or the mounting and the auxiliary capsule 3. A composition A is situated in the second partial volume. The auxiliary capsule 3 contains a composition B. The auxiliary capsule 3 has an ejection piston 8, wherein composition B is conveyed out of the auxiliary capsule 3 when pushing and/or turning the ejection piston 8.

Figure 2:
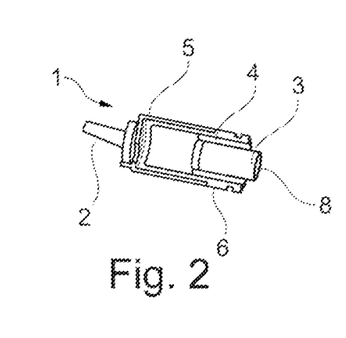
FIG. 2 shows a mixing capsule 1 according to the invention with pushed in auxiliary capsule 3 and pushed in ejection piston 8 of the auxiliary capsule 3 in cross profile.

FIG. 2 shows the mixing capsule 1 according to the invention with pushed in auxiliary capsule 3 and pushed in ejection piston 8 of the auxiliary capsule 3 in cross profile. The auxiliary capsule 3 has completely been received by the cylindrical inside pipe 4 or the mounting of the mixing capsule 1. Composition B flows into the second partial volume of the mixing capsule in which composition A is situated already.

Figure 3:
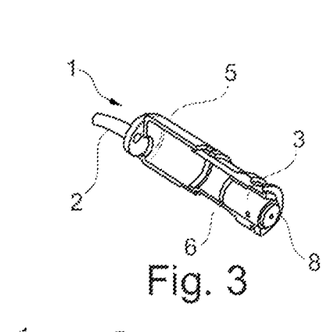
FIG. 3 shows a mixing capsule 1 according to the invention with a second position of the inner housing sleeve 6 in cross profile.

FIG. 3 shows the mixing capsule 1 according to the invention with a second position of the inner housing sleeve 6 in cross profile. Outer housing sleeve 5 and inner housing sleeve 6 are pulled apart along the longitudinal axis of the cylinder in a telescope-like manner. The second partial volume is strongly increased compared to the first position of the inner housing sleeve 6, so that an extended mixing space is available. Compositions A and B may now be mixed in the extended mixing space to composition C. Composition C formed shall be obtained with greatest possible homogeneity.

Emptying the auxiliary capsule 3 is carried out by pushing forward the ejection piston 8, what is done previously. Pulling apart the outer and inner housing sleeve is carried out only for increasing the mixing space. The increased mixing space has a decisive influence on the attainable homogeneity of the mixing product.

FIG. 4 shows an exterior view of the mixing capsule 1 according to the invention with a second position of the inner housing sleeve 6 in mixing phase. Outer housing sleeve 5 and inner housing sleeve 6 are pulled apart along the longitudinal axis of the cylinder in a telescope like manner. Structures fitting exactly to each other to form a bayonet catch 7 in the first position of the inner housing sleeve are situated on the lateral surface of the outer housing sleeve 5 and the inner housing sleeve 6. On that point, the outer housing sleeve 5 and the inner housing sleeve 6 are not just mounted displaceably against each other along the longitudinal axis, but a certain rotatability must be given about the longitudinal axis, so that locking of the bayonet catch 7 is ensued.

FIG. 5 shows the mixing capsule 1 according to the invention after mixing phase in cross profile. Composition C is now situated in the reduced second partial volume of the mixing capsule 1. The auxiliary capsule 3 no longer contains composition B.

In FIG. 6, the applicator 2 is rotated such that the paste may be conveyed out. In doing so, there is congruency between a hole 16 of the round disc 24 of the applicator 2, a discharge opening 22 of the applicator 2 and an outlet opening 17 of the outer housing sleeve 5 (see FIGS. 9 and 12). The auxiliary capsule 3 has completely been received by the cylindrical inside pipe 4. The ejection piston 8 is completely situated in the auxiliary capsule 3 in pushed in position. The second partial volume with composition C is reduced compared to mixing phase. Furthermore, the internal volume 9 is shown in the outer housing sleeve and optionally inner housing sleeve.

FIG. 7 shows a mixing capsule 1 according to the invention in ejection phase in cross profile. The second partial volume having composition C is reduced even more by the cylindrical inside pipe 4 along with the auxiliary capsule 3 is displaced along the longitudinal axis towards the applicator. Composition C is now ejected out of the second partial volume of the mixing capsule 1 in case of an opened applicator 2.

Figure 8:
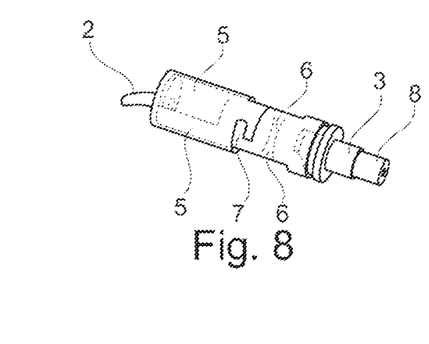
FIG. 8 shows an exterior view of the mixing capsule according to the invention after the outer housing sleeve 5 and the inner housing sleeve 6 being pushed apart, so that the inner housing sleeve 6 is in the second position.

FIG. 8 shows an exterior view of the mixing capsule according to the invention in starting state according to FIG. 1. Inner housing sleeve 6 and outer housing sleeve 5 are telescoped in a telescope-like manner. Parts of a bayonet catch 7 are clearly visible.

Figure 9:
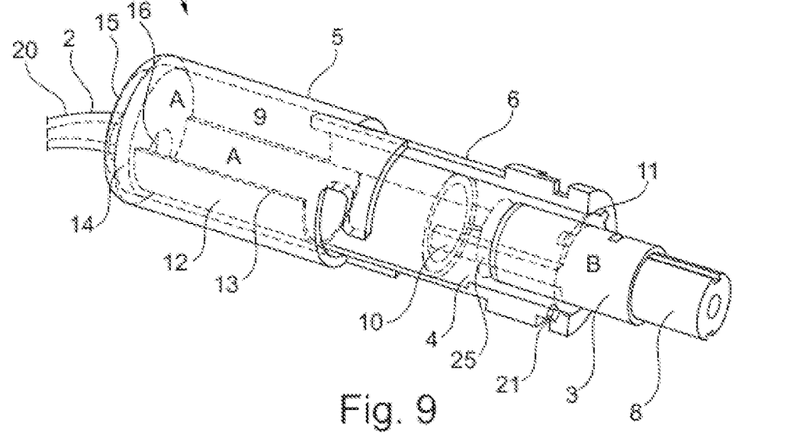
FIG. 9 shows a second embodiment of the mixing capsule 1.

FIG. 9 shows a second embodiment of the mixing capsule 1. The inner housing sleeve 6 is in the second position after the outer housing sleeve 5 and the inner housing sleeve 6 being pushed apart. Contrary to the first embodiment, the ejection piston 8 is not yet driven into the auxiliary capsule 3 in this phase in case of the second embodiment. The auxiliary capsule 3 has a helical bar 11 at its outer periphery, by which the auxiliary capsule 3 is guided with respect to the degree of rotation when being pushed into and/or turned into the cylindrical inside pipe 4. In an embodiment, the cylindrical inside pipe 4 may be a guiding groove or merely a mounting. In an embodiment, the cylindrical inside pipe 4 has at least one guiding rail 10. The auxiliary capsule 3 is guided by the at least one guiding rail 10 when being pushed into the cylindrical inside pipe 4 of the inner housing sleeve 6. Preferably, the guiding rail 10 is embodied in pairs in order that higher stability is ensued when guiding the auxiliary capsule 3. Preferably, the auxiliary capsule 3 has a membrane fixture 25 at its side facing the applicator 2 being breakable through or penetrable through respectively. Thus, in an embodiment, the membrane fixture 25 at the auxiliary capsule 3 is penetrable by the ejection piston 8. In a further embodiment, a penetrable membrane fixture is situated at the end of the inner housing sleeve 6 facing the applicator 2. In this case, the membrane fixture is penetrable by the auxiliary capsule 3 and/or the ejection piston 8. Preferably, the membrane fixture comprises a membrane or foil, optionally being arranged at the auxiliary capsule or the inner housing sleeve with a frame. Alternatively, the membrane fixture may comprise a membrane or foil agglutinated to said components.

The outer housing sleeve 5 has a guiding groove 12 in its inside. The cylindrical inside pipe 4, the auxiliary capsule 3 and the ejection piston 8 may be guided along said guiding groove 12 when outer and inner housing sleeve being telescoped and/or turned together. Respectively at least one detent cam 13 is situated on the longitudinal edges of the guiding groove 12 for engaging with at least one recess and/or an end edge of the cylindrical inside pipe 4 and/or the auxiliary capsule 3.

A round disc 14 with hole 16 is situated at the top surface 15 of the cylinder in the inside of the outer housing sleeve. In an embodiment, the round disc 14 is integrally connected to the guiding groove 12. In an embodiment, the round disc 24 is mounted rotatably about the longitudinal axis of the mixing capsule 1. The applicator 2 with discharge nozzle 20, discharge opening 22 and outlet opening 23 as well as an outlet opening 17 of the outer housing sleeve 5 is situated at the top surface 15 (see FIG. 12). The mixing capsule 1 is opened and mixing product C is dischargeable through the discharge nozzle 20, only when hole 16 of the round disc, outlet opening 17 of the outer housing sleeve 5 and discharge opening 22 of the applicator 2 being in congruency.

Figure 10:
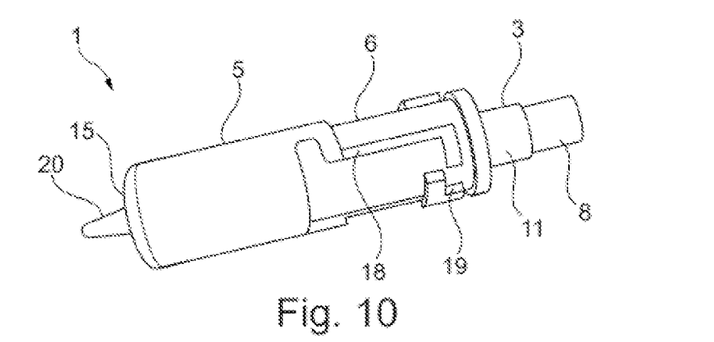
FIG. 10 shows a guiding notch 18 and/or a guiding bar on the outer periphery of the mixing capsule 1.

FIG. 10 shows a guiding notch 18 and/or a guiding bar on the outer periphery of the mixing capsule 1. A counter-structure here not visible forms a bayonet catch 7 together with the cross bar 19 when the inner housing sleeve 6 and the outer housing sleeve 5 being telescoped or turned together.

The helical bar 11 for guiding the auxiliary capsule 3 in the cylindrical inside pipe 4 is visible at the auxiliary capsule 3. The ejection piston 8 is not yet pushed into the auxiliary capsule 3. The discharge nozzle 20 of the applicator 2 is situated at the top surface 15 of the mixing capsule 1.

Figure 11:
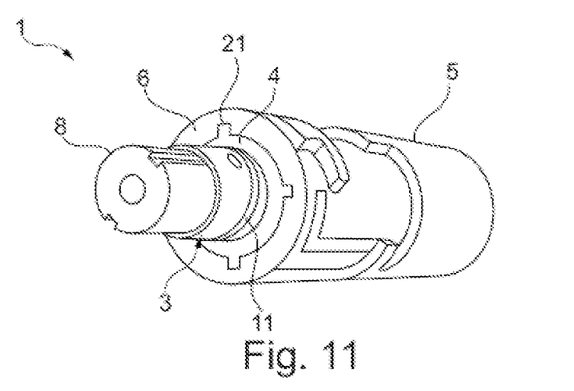
FIG. 11 shows the mixing capsule 1 from the outside with view on the ejection piston 8 and the auxiliary capsule 3.

FIG. 11 shows the mixing capsule 1 from the outside with view on the ejection piston 8 and the auxiliary capsule 3. A helical bar 11 is situated on the outer periphery of the auxiliary capsule 3. The auxiliary capsule 3 is surrounded by the cylindrical inside pipe 4. At least one guiding bar 21 is situated on the cylindrical inside pipe 4. In an embodiment, four guiding bars 21 are situated at the outside of the cylindrical inside pipe 4.

Figure 12:
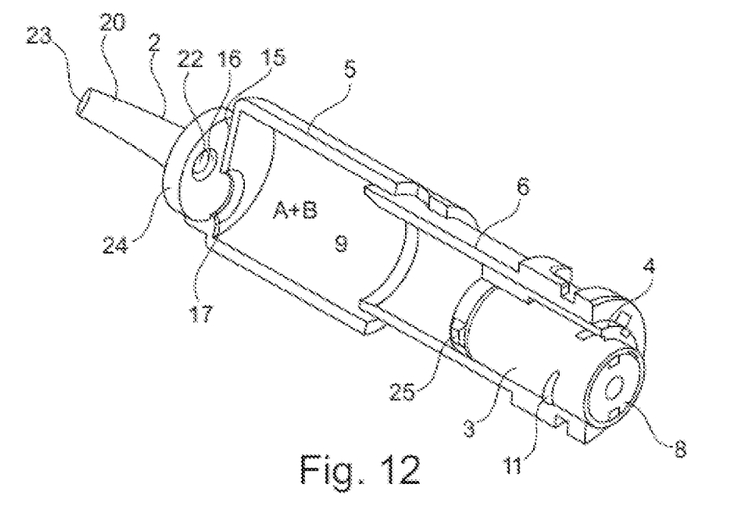
FIG. 12 shows the first embodiment with extended mixing space volume.

FIG. 12 shows the first embodiment with extended mixing space volume, i.e. the inner housing sleeve 6 is in the second position after the outer housing sleeve 5 and the inner housing sleeve 6 being pushed apart or turned apart. The ejection piston 8 is already driven into the auxiliary capsule 3 in this embodiment. The auxiliary capsule 3 has almost completely been received by the cylindrical inside pipe 4. A helical bar 11 is visible on the auxiliary capsule 3 on its outer periphery. Furthermore, the internal volume 9 is shown in the outer housing sleeve 5 and optionally inner housing sleeve 6—depending on the position of the inner housing sleeve along the longitudinal axis—in which compositions A and B are situated.

The applicator 2 with discharge nozzle 20 and round disc 24 having a hole 16 and being mounted rotatably about the longitudinal axis of the mixing capsule 1 is situated at the top surface 15 of the cylindrical mixing capsule 1. The discharge nozzle 20 is restricted by an outlet opening 23 and a discharge opening 22, the latter being arranged congruently to the hole 16 of the round disc 24. The outer housing sleeve 5 further has an outlet opening 17 at the top surface 15. In order to open the mixing capsule 1, rotation of the round disc 24 is required until the discharge opening 22 of the applicator 2, the hole 16 of the round disc 24 and the outlet opening 17 of the outer housing sleeve 5 being congruent to each other.

Figure 13:
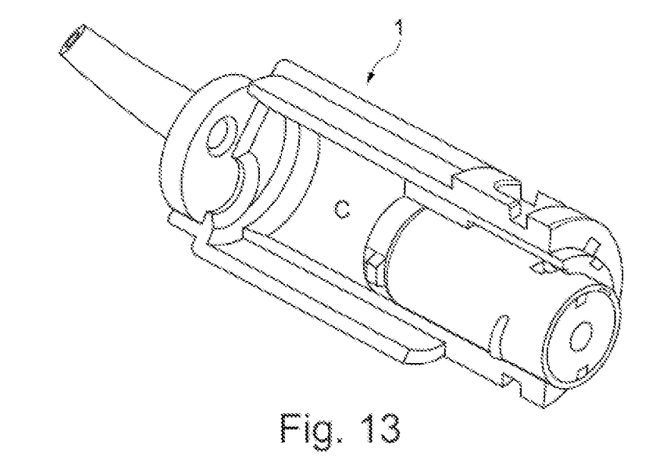
FIG. 13 shows a mixing capsule 1 with composition C.

FIG. 13 shows a mixing capsule 1 with a composition C obtainable by mixing compositions A and B.

LIST OF REFERENCE NUMERALS

1 mixing capsule
2 applicator
3 auxiliary capsule
4 cylindrical inside pipe or mounting
5 outer housing sleeve
6 inner housing sleeve
7 bayonet catch
8 ejection piston
9 internal volume
10 guiding rail
11 helical bar
12 guiding groove
13 detent cam
14 round disc
15 top surface
16 hole
17 outlet opening of the outer housing sleeve 5
18 guiding notch
19 cross bar
20 discharge nozzle
21 guiding bar
22 discharge opening
23 outlet opening of the applicator
24 round disk
25 membrane fixture

The invention claimed is:

1. A mixing capsule (1) comprising a housing in the form of a cylinder, wherein the mixing capsule has an applicator (2) at the top surface (15) of the cylinder and an auxiliary capsule (3) to receive a composition B in the region of the base surface of the cylinder being mounted displaceably in the direction of the longitudinal axis, the auxiliary capsule (3) being mounted displaceably in the direction of the longitudinal axis in a cylindrical inside pipe (4) and/or a mounting of the mixing capsule (1), the housing of the mixing capsule comprising an outer housing sleeve (5) and an inner housing sleeve (6) being mounted rotatably against each other and displaceably in a telescope-like manner into each other, the auxiliary capsule (3) and the cylindrical inside pipe (4) and/or the mounting taking a first partial volume of the internal volume of the mixing capsule (1) in a first position of the inner housing sleeve (6), the mixing capsule (1) having a second partial volume of the internal volume (9) to receive a composition A being independent from the auxiliary capsule (3) and the cylindrical inside pipe (4) and/or the mounting, the internal volume (9) of the cylinder being increased compared to the first position in a second position of the inner housing sleeve (6) after the outer housing sleeve (5) and the inner housing sleeve (6) being pushed apart in a telescope-like manner along the longitudinal axis, the increased internal volume (9) being adapted to receive composition B of the auxiliary capsule (3) besides composition A, composition A and composition B being mixable to composition C by moving the mixing capsule, composition C being ejectable via the applicator (2) when the outer housing sleeve (5) and the inner housing sleeve (6) being telescoped, the auxiliary capsule (3) having an ejection piston (8), the ejection piston (8) being adapted to convey composition B from the auxiliary capsule (3) into the second partial volume or the increased internal volume (9) when being pushed or turned, the cylindrical inside pipe (4) or the mounting being adapted to receive the auxiliary capsule (3), the inner housing sleeve (6) being mounted displaceably within the outer housing sleeve (5) along the longitudinal axis of the mixing capsule (1) and rotatably about the longitudinal axis of the mixing capsule (1), the cylindrical inside pipe (4) or the mounting being mounted displaceably within the inner housing sleeve (6) along the longitudinal axis of the mixing capsule (1), and a part of the outer housing sleeve (5) and a part of the inner housing sleeve (6) being lockable in a first position of the inner housing sleeve (6) after the outer housing sleeve (5) and the inner housing sleeve (6) being telescoped along the longitudinal axis and after being rotated about the longitudinal axis.

2. The mixing capsule (1) according to claim 1, wherein a part of the outer housing sleeve (5) and a part of the inner housing sleeve (6) form a bayonet catch (7) in a first position of the inner housing sleeve (6) after the outer housing sleeve (5) and the inner housing sleeve (6) being telescoped.

3. The mixing capsule (1) according to claim 1, wherein the outer housing sleeve (5) encases the inner housing sleeve in part in the first position and in the second position of the inner housing sleeve (6), the encasement being larger in the first position than in the second position.

4. The mixing capsule (1) according to claim 1, wherein the outer housing sleeve (5) encases the inner housing sleeve in part in the first position and in the second position of the inner housing sleeve (6), the encasement being maximal in the first position and minimal in the second position.

5. The mixing capsule (1) according to claim 1, wherein the cylindrical inside pipe (4) and/or the mounting of the mixing capsule (1) has at least one guiding rail (10), the at least one guiding rail (10) being adapted to guide the auxiliary capsule (3) when being slid into the cylindrical inside pipe (4) and/or the mounting of the inner housing sleeve (6).

6. The mixing capsule (1) according to claim 1, wherein the auxiliary capsule (3) has a helical bar (11) at the outer periphery, the helical bar (11) being adapted to guide the auxiliary capsule (3) when being rotated about the longitudinal axis of the auxiliary capsule (3) and when the auxiliary capsule (3) being slid into the cylindrical inside pipe (4) and/or the mounting of the inner housing sleeve (6), the helical bar (11) interacting with a notch and/or recess at the cylindrical inside pipe (4) and/or the mounting when the auxiliary capsule (3) being rotated about the longitudinal axis of the auxiliary capsule (3) and when the auxiliary capsule (3) being slid into the cylindrical inside pipe (4) and/or into the mounting of the inner housing sleeve (6).

7. The mixing capsule (1) according to claim 1, wherein the outer housing sleeve (5) has a guiding groove (12) in its inside, the guiding groove (12) being directly adjacent to the inner housing sleeve (6), the guiding groove (12) being adapted to completely receive the cylindrical inside pipe (4) and/or the mounting along with auxiliary capsule (3) and ejection piston (8) when the cylindrical inside pipe (4) and/or the mounting along with the auxiliary capsule (3) and the ejection piston (8) being displaced from the inner housing sleeve (6) into the outer housing sleeve (5) along the longitudinal axis of the mixing capsule (1), the guiding groove (12) in particular having respectively one detent cam (13) at each of its longitudinal edges, being adapted to interact with an end edge and/or a recess of the cylindrical inside pipe (4) and/or the mounting.

8. The mixing capsule (1) according to claim 1, wherein the applicator (2) has a round disc (24) at the top surface (15) of the outer housing sleeve (5), the round disc (24) being mounted rotatably about the longitudinal axis of the mixing capsule (1), the round disc (24) having a hole (16) being arranged congruently to a discharge opening (22) of the applicator (2), the applicator (2) further having an outlet opening (23), a discharge nozzle (20) being arranged between the discharge opening (22) and the outlet opening (23) of the applicator.

9. The mixing capsule (1) according to claim 8, wherein the applicator (2) has a rotatably mounted disc (24) at the top surface of the cylinder, the round disc (24) being rotatable congruently with the hole (16) to the discharge opening (22) of the applicator (2).

10. The mixing capsule (1) according to claim 7, wherein the guiding groove (12) and the round disc (24) are integrally connected and the hole (16) is rotatable congruently to the discharge opening (22) of the applicator (2) by rotating the inner housing sleeve (6).

11. The mixing capsule (1) according to claim 10, wherein the outer housing sleeve (5) has an outlet opening (17) at its top surface (15), the hole (16) of the round disc (24) of the applicator (2) being bringable into congruency to the outlet opening (17) of the outer housing sleeve (5) by rotating the round disc (24) about the longitudinal axis of the mixing capsule (1).

12. The mixing capsule (1) according to claim 1, wherein the inner housing capsule (6) has at least one guiding notch (18) or guiding bar and at least one cross bar (19) at its outside for the bayonet catch (7).

13. The mixing capsule (1) according to claim 1, wherein the cylindrical inside pipe (4) and/or the mounting has at least one guiding bar (21) at its outside, the at least one guiding bar (21) being adapted to guide the cylindrical inside pipe (4) and/or the mounting when being slid into the inner housing sleeve (6) and into the outer housing sleeve (5).

14. The mixing capsule (1) according to claim 1, wherein the mixing capsule (1) comprises cyclic olefin polymer, cyclic olefin copolymers, polyethylene, polypropylene, polyethylene having low density, polyethylene having high density, polypropylene having low density, polypropylene having high density and/or mixtures containing at least one of the afore-mentioned polymers.

15. A method for mixing at least two compositions A and B to a composition C in a mixing capsule (1) according to claim 1, wherein the method comprises the steps of:
(A.i) providing a mixing capsule having an inserted auxiliary capsule (3) with composition B in a cylindrical inside pipe (4) or a mounting of the mixing capsule (1), the mixing capsule (1) containing composition A in the outer housing sleeve (5) and/or the inner housing sleeve (6);
(A.ii) optionally, letting composition B out into the second partial volume of the internal volume (9) of the mixing capsule (1);
(A.iii) increasing the internal volume (9) for compositions A and B by turning apart and pulling apart an inner housing sleeve (6) out of an outer housing sleeve (5) along the longitudinal axis of the mixing capsule;
(A.iv) mixing compositions A and B in the increased internal volume by the mixing capsule (1) being moved;
(A.v) obtaining composition C.

16. The method according to claim 15, wherein the method further comprises the steps of:
step (B.i) is carried out after step (A.i) optionally, turning and/or pushing an ejection piston (8) into the auxiliary capsule (3);
(B.ii) optionally, turning and/or pushing the auxiliary capsule (3) into the mixing capsule (1), the auxiliary capsule (3) being guided along a cylindrical inside pipe (4) or the mounting;
step (B.iii) is carried out after step (A.ii) optionally, opening a locking between an outer housing sleeve (5) and an inner housing sleeve (6).

17. The method according to claim 15, wherein (A.iv) mixing components A and B in the increased internal volume (9) is realised by a universal mixer for dental materials.

18. The method according to claim 15, wherein the method further comprises the steps of:
(A.i.vi) reducing the increased internal volume (9) by displacing the inner housing sleeve (6) into the outer housing sleeve (5) along the longitudinal axis of the mixing capsule (1) and rotating the inner housing sleeve and the outer housing sleeve about the longitudinal axis of the mixing capsule (1);
(A.vii) optionally, closing the locking of the inner housing sleeve and of the outer housing sleeve;
(A.viii) rotating a round disc (24) of the applicator about the longitudinal axis of the mixing capsule (1), so that a hole (16) of the round disc (24) is brought into congruency to an outlet opening (17) of the outer housing sleeve (5), the hole (16) of the round disc (24) being arranged congruently to a discharge opening (22) of the applicator (2), the applicator (2) further comprising an outlet opening (23), a discharge nozzle (20) being arranged between the discharge opening (22) and the outlet opening (23) of the applicator;

(A.xii) displacing the cylindrical inside pipe (4) or the mounting with inserted auxiliary capsule (3) in the direction of the applicator (2);

(A.xiii) discharging composition C out of the internal volume of the mixing capsule (1) through the discharge nozzle (20) of the applicator (2).

19. Method of using a mixing capsule (1) according to claim 1, an increased internal volume (9) being formed when an inner housing sleeve (6) being pulled apart and/or turned apart out of an outer housing sleeve (5), in which at least two compositions A and B are being mixed to a composition C.

20. Method of using according to claim 19 for storing, mixing and application of pasty to kneadable compositions.

21. A lit comprising a mixing capsule (1) according to claim 1 and a composition A and a composition B, the mixing capsule comprising a housing in the form of a cylinder, wherein the mixing capsule has an applicator (2) at the top surface of the cylinder and an auxiliary capsule (3) at the base surface of the cylinder being mounted displaceably in the direction of the longitudinal axis, the auxiliary capsule (3) being mounted displaceably in the direction of the longitudinal axis in a cylindrical inside pipe (4) and/or a mounting of the mixing capsule (1), the housing of the mixing capsule comprising an outer housing sleeve (5) and an inner housing sleeve (6) being mounted rotatably against each other and displaceably into each other, the auxiliary capsule (3) and the cylindrical inside pipe (4) and/or the mounting taking a first partial volume of the internal volume of the mixing capsule (1) in a first position of the inner housing sleeve (6), the mixing capsule (1) having a second partial volume of the internal volume (9) being independent from the auxiliary capsule (3) and the cylindrical inside pipe (4) and/or the mounting, the second partial volume having a composition A, the auxiliary capsule (3) containing a composition B, the internal volume (9) of the cylinder being increased compared to the first position in a second position of the inner housing sleeve (6) after the outer housing sleeve (5) and the inner housing sleeve (6) being pushed apart along the longitudinal axis, the increased internal volume (9) being adapted to receive composition B besides composition A, composition A and composition B being mixable to composition C by moving the mixing capsule, composition C being ejectable by the applicator (2) when the outer housing sleeve (5) and the inner housing sleeve (6) being telescoped.

\* \* \* \* \*

UNITED STATES PATENT AND TRADEMARK OFFICE
CERTIFICATE OF CORRECTION

PATENT NO. : 11,911,234 B2
APPLICATION NO. : 17/268829
DATED : February 27, 2024
INVENTOR(S) : Kemeny It is certified that error appears in the above-identified patent and that said Letters Patent is hereby corrected as shown below:

In the Claims

Column 17, Line 12, In Claim 20:
"Method of using according"
Should read:
"Method of using a mixing capsule (1) according".

Signed and Sealed this
Sixteenth Day of July, 2024

Katherine Kelly Vidal
*Director of the United States Patent and Trademark Office*